United States Patent Office

3,317,584
Patented May 2, 1967

3,317,584
ESTERS OF AMIDOXALIC ACID
Paul J. Stoffel, St. Louis, Mo., assignor to Monsanto Company, St. Louis, Mo., a corporation of Delaware
No Drawing. Filed Mar. 13, 1964, Ser. No. 351,827
6 Claims. (Cl. 260—465)

This invention relates to a procedure for preparing a family of esters of oxalamides. The purpose of the invention is to provide a new procedure for preparing compounds.

More specifically, the purpose of this invention is to provide compounds of the formula

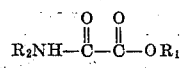

wherein $R_1$ and $R_2$ are both hydrocarbon radicals selected from the class consisting of alkyl having up to 12 carbon atoms, alkenyl having up to 12 carbon atoms, alkynyl of up to 12 carbon atoms, cycloalkyl having from 4 to 7 carbon atoms, benzyl, phenyl, naphthyl, and cycloalkenyl of four to six carbon atoms; and the said hydrocarbon radicals having substituents selected from the class consisting of chlorine, bromine, nitro, cyano, alkyl of up to four carbon atoms, alkoxy of up to four carbon atoms, alkenyl of up to four carbon atoms, alkenoxy of up to four carbon atoms, alkynyl of up to four carbon atoms and alkynoxy of up to four carbon atoms.

The procedure involves the reaction of cyclic anhydrides with alcohols or phenols in accordance with the equation:

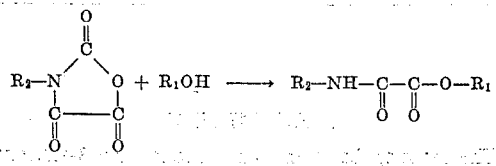

These cyclic anhydrides, otherwise identified as N-substituted oxazolidinetriones, are described and claimed in application Serial No. 310,854, filed September 9, 1963, by Paul J. Stoffel, which application also includes a disclosure of useful methods for their preparation. This application has now issued as U.S. Patent 3,264,317.

The $R_1OH$ may be alcohols such as methanol, cyclohexanol, benzyl alcohol, decyl alcohol and any other organic compound containing a hydroxyl group on an aliphatic carbon atom. Alternatively, the $R_1OH$ may be a phenolic compound, such as phenol, naphthol and other organic compounds having a hydroxyl group attached to a benzenoid carbon atom.

The reaction between oxazolidinetriones and the said hydroxy compounds ($R_1OH$) is effected by contacting the reagents dissolved in an excess of the alcohol or phenol. The reaction is exothermic and no additional heating is required. The reaction is spontaneous and carbon dioxide is evolved. The action may become too vigorous and gradual addition of the oxazolidinetrione to a large excess of the organic hydroxy compound may become advisable. A cooled reactor or a cold reflux condenser may be used to keep the reaction under control. When the reaction is complete, the product may be precipitated under reaction conditions. By cooling, a high yield of the desired product is recovered in crystalline form.

The product may be purified by dissolution in a suitable solvent, for example the alcohol or phenol from which it is synthesized. Upon cooling, the product is crystallized in pure form.

EXAMPLE 1

Methyl 3,4-dichloroxanilate

A flask was gradually charged with 3-(3,4-dichlorophenyl)oxazolidinetrione by adding it to an excess of methanol. A vigorous reaction took place with evolution of carbon dioxide. Upon cooling the reaction the product precipitated in white plate-like crystals, M.P. 163.6 to 164.2° C. The product was found to have the structure:

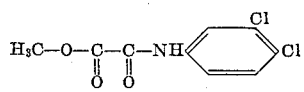

EXAMPLE 2

Ethyl N-propynyloxamate

The procedure of the above example was repeated using 3-allyloxazolidinetrione and ethyl alcohol as the reactants. The resulting product was found to have the structure:

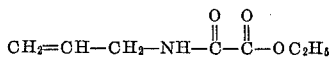

EXAMPLE 3

Isopropyl N-cyclohexyloxamate

By reacting 3-cyclohexylazolidinetrione with an excess of isopropanol with gradual intermixing the reagents, a product of the following structure was recovered:

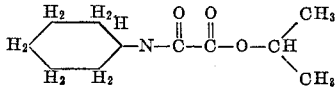

EXAMPLE 4

Dodecyl N-benzyloxamate 3-benzyloxazolidinetrione was mixed with an excess of n-dodecyl alcohol at an ambient temperature for three hours. The reaction mixture was cooled and a solid product precipitated. The crystalline product was identified as having the structure:

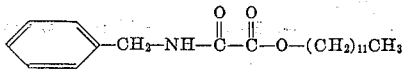

EXAMPLE 5 t-Butyl N-cyclopentadienyloxamate

A product was made by condensing 3-cyclopentadienyloxazolidinetrione with t-butyl alcohol in an excess of the alcohol. The reaction was effected at a temperature maintained below 50° C. Upon cooling a crystalline product was formed which was found to have the structure:

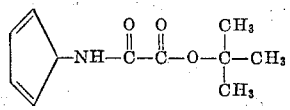

EXAMPLE 6

Methyl p-methoxyoxanilate

3(p-methoxyphenyl)oxazolidinetrione was reacted with an excess of methanol by charging a flask with the methanol and gradually adding thereto the other reactant at a rate such that the reaction was maintained under control. A compound of the following formula was recovered from the reaction mixture:

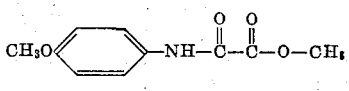

EXAMPLE 7

*n-Octyl 3,4-dichlorooxanilate*

Using the procedure of Example 5, 3(2,4-dichlorophen- formed.

$$R_2-NH-\underset{\underset{O}{\|}}{C}-\underset{\underset{O}{\|}}{C}-OR_1$$

| Phenols | N-Substituted Oxamates | M.P., °C. |
|---|---|---|
| 3,5-dimethylphenol | $CH_3-NH-\underset{\underset{O}{\|}}{C}-\underset{\underset{O}{\|}}{C}-O$-C$_6$H$_3$(CH$_3$)$_2$ | 124.1–124.8 |
| 3,4-dichlorophenol | $CH_3-NH-\underset{\underset{O}{\|}}{C}-\underset{\underset{O}{\|}}{C}-O$-C$_6$H$_3$Cl$_2$ | 116.1–116.7 |
| 4-chloro-3,5-dimethylphenol | $CH_3-NH-\underset{\underset{O}{\|}}{C}-\underset{\underset{O}{\|}}{C}-O$-C$_6$H$_2$(CH$_3$)$_2$Cl | 158.1–158.6 |
| 3-cyanophenol | $CH_3-NH-\underset{\underset{O}{\|}}{C}-\underset{\underset{O}{\|}}{C}-O$-C$_6$H$_4$CN | 132.9–133.5 |
| 4-methoxyphenol | $CH_3-NH-\underset{\underset{O}{\|}}{C}-\underset{\underset{O}{\|}}{C}-O$-C$_6$H$_4$-OCH$_3$ | 130–131 |
| β-Naphthol | $CH_3-NH-\underset{\underset{O}{\|}}{C}-\underset{\underset{O}{\|}}{C}-O$-C$_{10}$H$_7$ | 115.6–116.2 |
| 4-t-butyl-2-methylphenol | $CH_3-NH-\underset{\underset{O}{\|}}{C}-\underset{\underset{O}{\|}}{C}-O$-C$_6$H$_3$(CH$_3$)(C(CH$_3$)$_3$) | 69.1–70.5 | yloxazolidinetrione was reacted with n-octanol to produce a compound of the formula

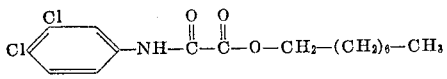

EXAMPLE 8

*Methyl p-nitrooxanilate*

By using the procedure of Example 5 and replacing the oxazolidinetrione with p-nitrophenyloxazolidinetrione a compound of the following formula was recovered from the reaction mixture:

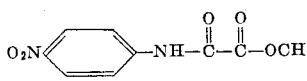

EXAMPLE 9

*Allyl N(4-bromo-2-methylbenzyl)oxamate*

The reaction between 2-methyl-4-bromobenzyloxazolidinetrione and allyl alcohol produced a compound identified as that of the formula

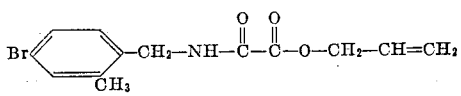

EXAMPLES 10 THROUGH 16

Compounds were prepared by reacting 3-methyloxazolidinetrione with each of the phenols identified by the following table. The table also discloses the ester formed and then the physical properties

EXAMPLE 17

The reaction between p-nitrophenol and 3-allyloxazolidinetrione produced a crystallized product of the structure:

$$CH_2=CH-CH_2-NH-\underset{\underset{O}{\|}}{C}-\underset{\underset{O}{\|}}{C}-O-C_6H_4-NO_2$$

By the specifically described procedures, N-substituted oxazolidinetriones were reacted with selected alcohols and phenols to prepare the following:

Cyclohexyl p-allyloxyoxanilate
Naphthyl N-cyanobenzyloxamate
Propargyloxymethyl N-naphthyloxamate
Benzyl p-propargyloxanilate
Allyl N-(3-methoxypropyl)oxamate
p-Nitrophenyl N-cyclopentadienyloxamate
o-Bromo-p-methoxybenzyl N-allylbenzyloxamate
p-Allyloxyphenyl p-methoxyanilate Although the invention is described with reference to syecific examples, it is not intended that the details thereof are limitations on the scope of the invention except to the extent incorporated in the appended claims.

What is claimed is:

1. The method of preparing compounds of the structure:

$$C_6H_5-NH-\underset{\underset{O}{\|}}{C}-\underset{\underset{O}{\|}}{C}-CR$$

wherein R is alkyl of up to 12 carbon atoms, which comprises contacting the oxazolidinetrione of the formula

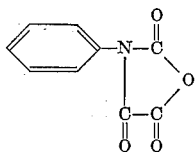

with an alkyl alcohol of up to 12 carbon atoms.

2. The method of preparing methyl 3,4-dichlorooxanilate which comprises reacting 3-(3',4'-dichlorophenyl)oxazolidinetrione with an excess of methanol.

3. The method of preparing 3,4-dichlorophenyl N-methyloxamate which comprises reacting 3-methyloxazolidinetrione with an excess of 3,4-dichlorophenol.

4. The method of preparing cyanophenyl N-methyloxamate which comprises contacting 3-cyanophenol with 3-methyloxazolidinetrione with a large excess of 3-cyanophenol.

5. The method of preparing p-methoxyphenyl N-methyloxamate which comprises contacting 3-methyloxazolidinetrione with a large excess of p-methoxyphenol.

6. The method of preparing methyl p-methoxyoxanilate which comprises contacting 3(p-methoxyphenyl)oxazolidinetrione with a large excess of methanol.

No references cited.

CHARLES B. PARKER, *Primary Examiner.*

D. H. TORRENCE, *Assistant Examiner.*